(12) United States Patent
Robinson

(10) Patent No.: US 11,025,470 B2
(45) Date of Patent: Jun. 1, 2021

(54) COMMUNICATION SYSTEM AND METHOD USING ORTHOGONAL FREQUENCY DIVISION MULTIPLEXING (OFDM) WITH NON-LINEAR TRANSFORMATION

(71) Applicant: Rampart Communications, Inc., Annapolis, MD (US)

(72) Inventor: Matthew Brandon Robinson, Crownsville, MD (US)

(73) Assignee: Rampart Communications, Inc., Annapolis, MD (US)

( * ) Notice: Subject to any disclaimer, the term of this patent is extended or adjusted under 35 U.S.C. 154(b) by 56 days.

(21) Appl. No.: 16/459,254

(22) Filed: Jul. 1, 2019

(65) Prior Publication Data

US 2021/0006446 A1    Jan. 7, 2021

(51) Int. Cl.
*H04L 27/26*    (2006.01)
*H04J 11/00*    (2006.01)
*H04B 7/0456*    (2017.01)

(52) U.S. Cl.
CPC ....... *H04L 27/2634* (2013.01); *H04B 7/0456* (2013.01); *H04J 11/003* (2013.01)

(58) Field of Classification Search
None
See application file for complete search history.

(56) References Cited

U.S. PATENT DOCUMENTS

| | | |
|---|---|---|
| 5,237,587 A | 8/1993 | Schoolcraft |
| 5,345,599 A | 9/1994 | Paulraj et al. |
| 5,555,268 A | 9/1996 | Fattouche et al. |
| 6,389,138 B1 | 5/2002 | Li et al. |
| 7,376,173 B2 | 5/2008 | Yedidia et al. |

(Continued)

FOREIGN PATENT DOCUMENTS

| | | |
|---|---|---|
| CN | 1813435 A | 8/2006 |
| CN | 101179539 A | 5/2008 |

(Continued)

OTHER PUBLICATIONS

Hug Fei,A new efficient physical layer OFDM encryption scheme, IEEE,XP032613384,pp. 1024-1032 , Apr. 27, 2014 (Year: 2014).*

(Continued)

*Primary Examiner* — Fahmida S Chowdhury
(74) *Attorney, Agent, or Firm* — Cooley LLP

(57) ABSTRACT

A method of encoding data includes identifying multiple complex number pairs of a data vector and generating a transformed data vector by applying a non-linear transformation to each complex number pair from the multiple complex number pairs. The non-linear transformation includes modifying a phase of a first complex number from each complex number pair. The phase modification is based on a value associated with a second complex number from each complex number pair. A signal representing the transformed data vector is sent to multiple transmitters for transmission to multiple receivers. A signal representing the non-linear transformation is sent to a compute device for transmission of the non-linear transformation to the multiple receivers prior to transmission of the signal representing the transformed data vector from the multiple transmitters to the multiple receivers, for recovery of the data vector at the multiple receivers.

19 Claims, 4 Drawing Sheets

(56) References Cited

U.S. PATENT DOCUMENTS

| | | |
|---|---|---|
| 7,454,084 B2 | 11/2008 | Faber et al. |
| 9,648,444 B2 | 5/2017 | Agee |
| 10,020,839 B2 | 7/2018 | Robinson et al. |
| 10,491,262 B2 | 11/2019 | Robinson et al. |
| 10,637,705 B1 | 4/2020 | Shattil |
| 10,735,062 B1* | 8/2020 | Robinson ............... G06F 7/556 |
| 10,771,128 B1 | 9/2020 | Sitaram et al. |
| 10,819,387 B2 | 10/2020 | Robinson et al. |
| 10,833,749 B1 | 11/2020 | Robinson |
| 2002/0009209 A1 | 1/2002 | Inoue et al. |
| 2003/0185309 A1 | 10/2003 | Pautler et al. |
| 2003/0210750 A1* | 11/2003 | Onggosanusi ...... H04L 25/0242 375/295 |
| 2004/0059547 A1* | 3/2004 | Aftelak .................. H04L 1/208 702/190 |
| 2004/0105489 A1 | 6/2004 | Kim et al. |
| 2004/0253986 A1* | 12/2004 | Hochwald ............ H04B 7/0669 455/562.1 |
| 2006/0109897 A1 | 5/2006 | Guo et al. |
| 2006/0274825 A1 | 12/2006 | Ciofi et al. |
| 2007/0091999 A1* | 4/2007 | Nissan-Cohen ..... H04N 19/166 375/240.2 |
| 2007/0098063 A1* | 5/2007 | Reznic .................. H04N 19/60 375/240.2 |
| 2007/0115797 A1* | 5/2007 | Reznic .................... G06T 9/007 370/203 |
| 2009/0046801 A1 | 2/2009 | Pan et al. |
| 2009/0316802 A1 | 12/2009 | Tong et al. |
| 2010/0119001 A1 | 5/2010 | Walton et al. |
| 2010/0202553 A1 | 8/2010 | Kotecha et al. |
| 2010/0246656 A1 | 9/2010 | Hammerschmidt |
| 2010/0329393 A1 | 12/2010 | Higuchi |
| 2011/0134902 A1 | 6/2011 | Ko et al. |
| 2011/0235728 A1* | 9/2011 | Karabinis ................ H04B 1/04 375/260 |
| 2012/0093090 A1 | 4/2012 | Han et al. |
| 2012/0257664 A1 | 10/2012 | Yue et al. |
| 2013/0064315 A1 | 3/2013 | Heath, Jr. et al. |
| 2013/0100965 A1 | 4/2013 | Ohmi et al. |
| 2013/0223548 A1 | 8/2013 | Kang et al. |
| 2014/0056332 A1 | 2/2014 | Soualle et al. |
| 2015/0003500 A1 | 1/2015 | Kesling et al. |
| 2015/0049713 A1 | 2/2015 | Lan et al. |
| 2015/0171982 A1 | 6/2015 | Wang et al. |
| 2015/0304130 A1 | 10/2015 | Logothetis et al. |
| 2016/0309396 A1 | 10/2016 | Chai et al. |
| 2016/0337156 A1 | 11/2016 | Milleth et al. |
| 2017/0180020 A1 | 6/2017 | Namgoong et al. |
| 2017/0237545 A1* | 8/2017 | Khandani ............ H04B 17/336 370/276 |
| 2017/0288902 A1 | 10/2017 | Rusek et al. |
| 2017/0294946 A1 | 10/2017 | Wang et al. |
| 2017/0302415 A1 | 10/2017 | Park et al. |
| 2017/0331539 A1 | 11/2017 | Pham et al. |
| 2019/0075091 A1 | 3/2019 | Shattil et al. |
| 2019/0097694 A1 | 3/2019 | Jeon et al. |
| 2019/0158206 A1 | 5/2019 | Li et al. |
| 2019/0268035 A1 | 8/2019 | Robinson et al. |
| 2019/0280719 A1 | 9/2019 | Yu |
| 2019/0349042 A1 | 11/2019 | Ramireddy et al. |
| 2019/0349045 A1 | 11/2019 | Varatharaajan et al. |
| 2019/0379430 A1 | 12/2019 | Pekoz et al. |
| 2020/0014407 A1 | 1/2020 | Smith et al. |
| 2020/0366333 A1 | 11/2020 | Robinson |

FOREIGN PATENT DOCUMENTS

| | | |
|---|---|---|
| CN | 101795257 A | 8/2010 |
| CN | 103634065 A | 3/2014 |
| CN | 103716111 A | 4/2014 |
| EP | 1826915 A1 | 8/2007 |
| EP | 1883168 A2 | 1/2008 |
| EP | 3211812 A1 | 8/2017 |
| KR | 10-2010-0131373 A | 12/2010 |
| KR | 10-2013-0118525 A | 10/2013 |
| WO | WO 2008/024773 A2 | 2/2008 |
| WO | WO 2008/098225 A2 | 8/2008 |

OTHER PUBLICATIONS

Huang et al., "Multi-dimensional encryption scheme based on physical layer for fading channel," IET Communications, Oct. 2018, vol. 12, Issue 19, pp. 2470-2477.

Huo and Gong, "A New Efficient Physical Layer OFDM Encryption Scheme," IEEE Infocom 2014, IEEE Conference on Computer Communications, pp. 1024-1032.

International Search Report and Written Opinion for International Application No. PCT/US2020/040393, dated Sep. 3, 2020, 12 pages.

Liu et al., "Piecewise Chaotic Permutation Method for Physical Layer Security in OFDM-PON," IEEE Photonics Technology Letters, Nov. 2016, vol. 28, No. 21, pp. 2359-2362.

International Search Report and Written Opinion for PCT Application No. PCT/US2017/061489, dated Feb. 26, 2018, 8 pages.

Wu et al., "Practical Physical Layer Security Schemes for MIMO-OFDM Systems Using Precoding Matrix Indices," IEEE Journal on Selected Areas in Communications, Sep. 2013, vol. 31, Issue 9, pp. 1687-1700.

Ericsson, "Signature design for NoMA," 3GPP TSG-RAN WG1 Meeting #93, Tdoc R1-1806241, Busan, South Korea, May 21-25, 2018, pp. 1-5.

International Search Report and Written Opinion for International Application No. PCT/US2020/039879, dated Oct. 9, 2020, 10 pages.

Invitation to Pay Additional Fees for International Application No. PCT/US2020/039606 dated Sep. 21, 2020, 12 pages.

Invitation to Pay Additional Fees for International Application No. PCT/US2020/043686 dated Oct. 7, 2020, 16 pages.

Invitation to Pay Additional Fees for International Application No. PCT/US2020/049031 dated Nov. 11, 2020, 13 pages.

Ma et al., "Secure Communication in TDS-OFDM System Using Constellation Rotation and Noise Insertion," IEEE Transactions on Consumer Electronics, Aug. 2010, vol. 56, No. 3, pp. 1328-1332.

Huawei, "Initial Performance Evaluation of Multi-user MIMO Scheme for E-UTRA Downlink," 3GPP TSG RAN WG1, R1-051094, San Diego, USA, Oct. 10-14, 2005, 7 pages.

International Search Report and Written Opinion for International Application No. PCT/US2020/049031, dated Jan. 18, 2021, 20 pages.

International Search Report and Written Opinion for International Application No. PCT/US2020/051927, dated Jan. 15, 2021, 19 pages.

Sung et al., "M-PSK Codebook Based Clustered MIMO-OFDM SDMA with Efficient Codebook Search," IEEE, 2012, 5 pages.

Tseng et al., "Hardware Implementation of the Joint Precoding Sub-System and MIMO Detection Preprocessor in IEEE 802.11n/ac WLAN," Journal of Signal Processing Systems (2019) 91:875-884.

Xie et al., "Geometric Mean Decomposition Based Hybrid Precoding for Millimeter-Wave Massive MIMO," China Communications, May 2018, vol. 15, Issue 5, pp. 229-238.

Zhang et al., "A Novel Precoder Design for MIMO Multicasting with MMSE-DFE Receivers," IEEE, 2014, 5 pages.

Zheng et al., "Performance Comparison on the Different Codebook for SU/MU MIMO," IEEE 802.16 Broadband Wireless Access Working Group, IEEE C802.16m-08/1183r1, Sep. 12, 2008, pp. 1-9.

\* cited by examiner

COMMUNICATION SYSTEM AND METHOD USING ORTHOGONAL FREQUENCY DIVISION MULTIPLEXING (OFDM) WITH NON-LINEAR TRANSFORMATION

STATEMENT REGARDING FEDERAL GOVERNMENT INTEREST

This United States Government holds a nonexclusive, irrevocable, royalty-free license in the invention with power to grant licenses for all United States Government purposes.

CROSS-REFERENCE TO RELATED APPLICATIONS

This application is related to U.S. Non-Provisional patent application Ser. No. 16/416,144, filed on May 17, 2019 and titled "COMMUNICATION SYSTEM AND METHODS USING MULTIPLE-IN-MULTIPLE-OUT (MIMO) ANTENNAS WITHIN UNITARY BRAID DIVISIONAL MULTIPLEXING (UBDM)"; and to U.S. Non-Provisional patent application Ser. No. 16/459,245, filed on Jul. 1, 2019 and titled "SYSTEMS, METHODS AND APPARATUS FOR SECURE AND EFFICIENT WIRELESS COMMUNICATION OF SIGNALS USING A GENERALIZED APPROACH WITHIN UNITARY BRAID DIVISION MULTIPLEXING"; and to U.S. Non-Provisional patent application Ser. No. 16/459,262, filed on Jul. 1, 2019 and titled "COMMUNICATION SYSTEM AND METHOD USING LAYERED CONSTRUCTION OF ARBITRARY UNITARY MATRICES," the disclosures of each of which are herein incorporated by reference in their entireties for all purposes.

TECHNICAL FIELD

The present invention relates generally to data communication, and more specifically to orthogonal frequency division multiplexing (OFDM) communication systems and techniques for enhancing security thereof.

BACKGROUND

Wireless communication systems are widely deployed to provide various types of communication services such as voice, packet data, and so on. These systems may utilize OFDM, which is a modulation technique capable of providing high performance for some wireless environments. OFDM effectively partitions the overall system bandwidth into a number of ($N_s$) orthogonal subbands, which are also commonly referred to as subcarriers, tones, bins, and frequency subchannels. With OFDM, each subband is associated with a respective carrier that may be modulated with data.

In OFDM, a stream of information bits is converted to a series of frequency-domain modulation symbols. One modulation symbol may be transmitted on each of the $N_s$ subbands in each OFDM symbol period (defined below). The modulation symbols to be transmitted on the $N_s$ subbands in each OFDM symbol period are transformed to the time-domain using an inverse fast Fourier transform (IFFT) to obtain a "transformed" symbol that contains $N_s$ samples. The input to an $N_s$-point IFFT is $N_S$ frequency-domain values and the output from the IFFT is $N_s$ time-domain samples. The number of subbands is determined by the size of the IFFT. Increasing the size of the IFFT increases the number of subbands and also increases the number of samples for each transformed symbol, which correspondingly increases the time required to transmit the symbol.

To combat frequency selective fading in the wireless channel used for data transmission (described below), a portion of each transformed symbol is typically repeated prior to transmission. The repeated portion is often referred to as a cyclic prefix, and has a length of $N_{cp}$ samples. The length of the cyclic prefix is typically selected based on the delay spread of the system, as described below, and is independent of the length of the transformed symbol. An OFDM symbol is composed of a transformed symbol and its cyclic prefix. Each OFDM symbol contains $N_s+N_{cp}$ samples and has a duration of $N_s+N_{cp}$ sample periods, which is one OFDM symbol period.

The size of the cyclic prefix relative to that of the OFDM symbol may have a large impact on the efficiency of an OFDM system. The cyclic prefix must be transmitted with each OFDM symbol to simplify the receiver processing in a multipath environment but carries no additional information. The cyclic prefix may be viewed as bandwidth that must be wasted as a price of operating in the multipath environment. The proportion of bandwidth wasted in this way can be computed using the formula $$\frac{N_{cp}}{N_s + N_{cp}}.$$

For example, if $N_{cp}$ is 16 samples and $N_s$ is 64 samples, then 20% of the bandwidth is lost to cyclic prefix overhead. This percentage may be decreased by using a relatively large value of $N_s$. Unfortunately, using a large value of $N_s$ can also lead to inefficiency, especially where the size of the information unit or packet to be transmitted is much smaller than the capacity of the OFDM symbol. For example, if each OFDM symbol can carry 480 information bits, but the most common packet contains 96 bits, then packing efficiency will be poor and much of the capacity of the OFDM symbol will be wasted when this common packet is sent.

Orthogonal frequency division multiple-access (OFDMA) can ameliorate the inefficiency due to excess capacity resulting from the use of a large OFDM symbol. For OFDMA, multiple users share the large OFDM symbol using frequency domain multiplexing. This is achieved by reserving a set of subbands for signaling and allocating different disjoint sets of subbands to different users. However, data transmission using OFDMA may be complicated by various factors such as, for example, different power requirements, propagation delays, Doppler frequency shifts, and/or timing for different users sharing the large OFDM symbol.

Existing OFDM systems typically select a single OFDM symbol size that is a compromise of various objectives, which may include minimizing cyclic prefix overhead and maximizing packing efficiency. The use of this single OFDM symbol size results in inefficiency due to excess capacity when transmitting packets of varying sizes. There is therefore a need in the art for an OFDM system that operates efficiently when transmitting packets of varying sizes.

In multiple access communications, multiple user devices transmit signals over a single communications channel to a receiver. These signals are superimposed, forming a combined signal that propagates over that channel. The receiver then performs a separation operation on the combined signal to recover one or more individual signals from the combined signal. For example, each user device may be a cell phone belonging to a different user and the receiver may be a cell tower. By separating signals transmitted by different user devices, the different user devices may share the same communications channel without interference.

A transmitter may transmit different symbols by varying a state of a carrier or subcarrier, such as by varying an amplitude, phase and/or frequency of the carrier. Each symbol may represent one or more bits. These symbols can each be mapped to a discrete value in the complex plane, thus producing Quadrature Amplitude Modulation, or by assigning each symbol to a discrete frequency, producing Frequency Shift Keying. The symbols are then sampled at the Nyquist rate, which is at least twice the symbol transmission rate. The resulting signal is converted to analog through a digital to analog converter, and then translated up to the carrier frequency for transmission. When different user devices send symbols at the same time over the communications channel, the sine waves represented by those symbols are superimposed to form a combined signal that is received at the receiver.

SUMMARY

Techniques are provided herein for modifying complex baseband symbols in a nonlinear manner, to enhance security of OFDM systems. In some embodiments, a method of encoding data includes identifying multiple complex number pairs of an input data vector and generating a transformed data vector by applying a non-linear transformation to each complex number pair from the multiple complex number pairs. The non-linear transformation includes modifying a phase of a first complex number from each complex number pair. The phase modification is based on a value associated with a second complex number from each complex number pair. A signal representing the transformed data vector is sent to multiple transmitters for transmission of a signal representing the transformed data vector from the multiple transmitters to multiple receivers. A signal representing the non-linear transformation is sent to a second compute device for transmission of the non-linear transformation to the multiple receivers prior to transmission of the signal representing the transformed data vector from the multiple transmitters to the multiple receivers, for recovery of the data vector at the multiple receivers.

As used herein, a "transmitter" (or "signal transmitter") refers to any collection of components that are used in the transmission of signals, including any combination of, but limited to, one or more: antennas, amplifiers, cables, digital-to-analog converters, filters, up-converters, processors (e.g., for reading bits and/or mapping of bits to a baseband), etc. Similarly, as used herein, a "receiver" (or "signal receiver") refers to any collection of components that are used in receiving signals, including any combination of, but limited to, one or more: antennas, amplifiers, cables, analog-to-digital converters, filters, down-converters, processors, etc.

DETAILED DESCRIPTION

When linear transformations are applied to data as part of an encoding (e.g., "pre-coding") or modulation process prior to transmission via a network, the transmitted data can be susceptible to deciphering by eavesdroppers who may be able to determine the linear transformations based on a small number of "plain/cipher" pairs and using, for example, a single matrix inversion. As such, systems and methods employing linear transformations can be improved by the non-linearization of pre-transmission data. Although known mechanisms exist for applying nonlinear operations on complex numbers in general, and notwithstanding the data security risks associated with linear transformations, the application of such mechanisms in the context of data modulation is not believed to have previously been successfully performed, for example because of the various constraints and considerations commonly associated with data modulation. For example, during modulation, the power of the signal being transmitted can be reduced, and noise and distortion can be amplified. Non-unitary and non-linear operations can amplify and distort signals, thereby increasing the Bit Error Rate (BER). Non-linear transformations are typically not isometric, and therefore also amplify noise and increase BER to undesirable levels. By contrast, unitary transformations preserve signal power and are isomorphic/isometric, and thus are used ubiquitously in signals without taking into account security considerations. Some known cryptologics include a non-linear component that can block a linear attack by an eavesdropper. Because such cryptologics operate on bits (i.e., bit-level security) rather than on symbols, however, noise is not of concern.

Some embodiments of the present disclosure include systems and methods that achieve non-linearization of pre-transmission data symbols as part of the modulation process, for establishing data privacy at the physical layer without amplifying noise. Non-linear transformations (or "transforms") set forth herein include non-linear transformations that do not amplify noise, or that introduce a minimal amount of amplification to noise. The non-linear transformation can be applied to input data (e.g., data vectors or symbols derived therefrom) once or several times, optionally interleaved with other transformations (linear or otherwise) any number of times.

Figure 1:
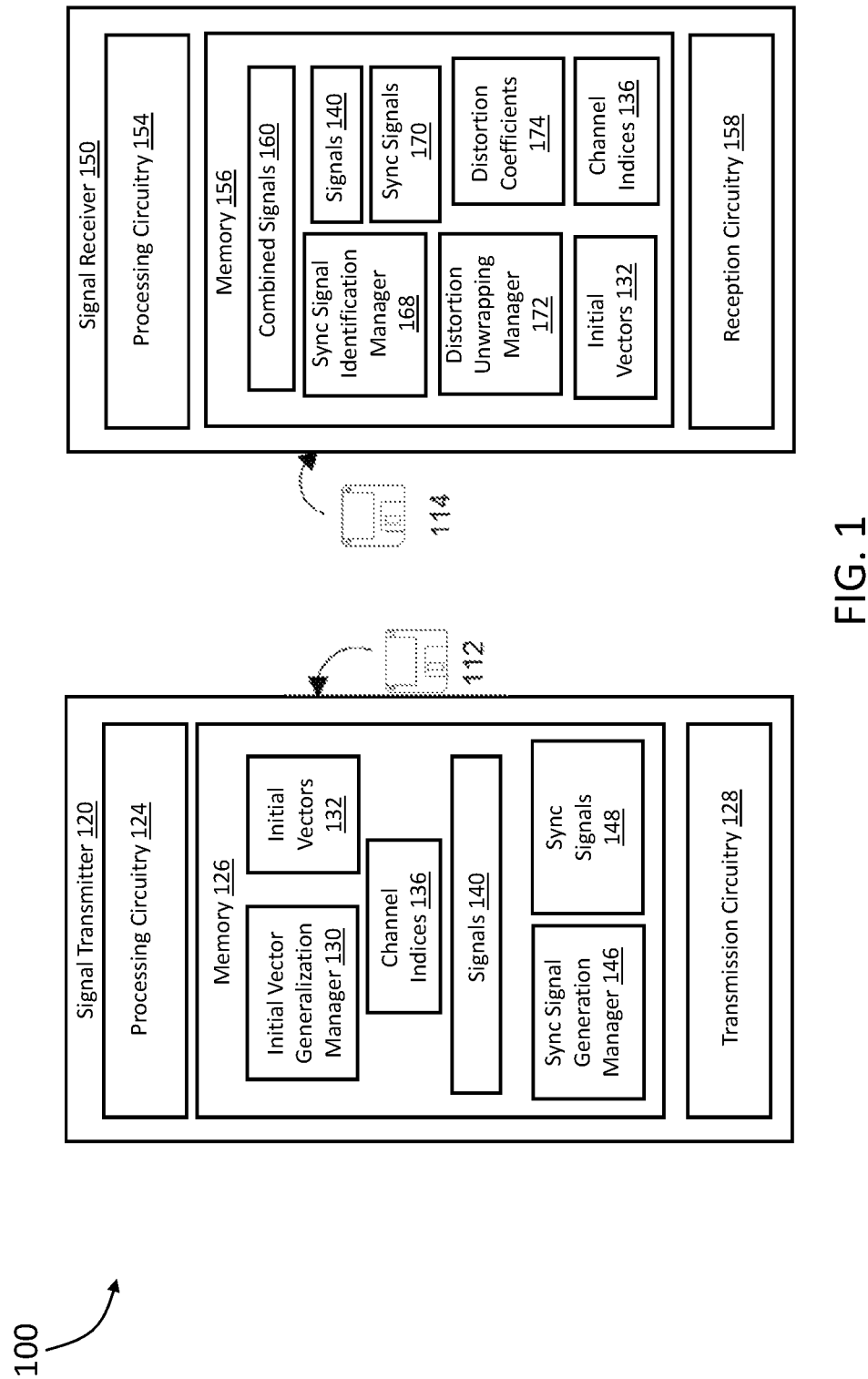
FIG. 1 is a block diagram illustrating an example electronic communications system within an electronic environment in which improved techniques described herein may be performed.

FIG. 1 is a diagram that illustrates an example system 100 in which improved techniques of transmitting wireless communications are performed. The system 100 includes a signal transmitter 120 and a signal receiver 150. It should be appreciated, however, that there may be other signal transmitters not pictured within the environment.

The signal transmitter 120 is configured to prepare signals for transmission to the signal receiver 150 and to transmit the prepared signals to the signal receiver 150. The signal transmitter 120 includes processing circuitry units 124, memory 126, and transmission circuitry unit 128. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein. The transmission circuitry 128 is configured to transmit signals in the form of radio-frequency energy to the receiver.

In some embodiments, one or more of the components of the signal transmitter 120 can be, or can include, processors (e.g., processing units 124) configured to process instructions stored in the memory 126. Examples of such instructions as depicted in FIG. 1 include an initial vector generation manager 130 and a sync signal generation manager 146. Further, as illustrated in FIG. 1, the memory 126 is configured to store various data, including initial vectors 132, channel indices 136, signals 140, and sync signals 148.

Fast Unitary Transformations

Methods and systems described above usually involve a matrix operation on a vector. If the length of the vector is N and the size of the matrix is N×N (e.g., when the matrix is a unitary matrix), then the matrix operation on the vector involves $O(N^2)$ multiplications. Accordingly, as N increases, the computational burden on the telecommunication system can be prohibitive.

In some embodiments, some fast unitary transformations can be employed to reduce the calculation complexity. For example, the matrix operation on the vector can be achieved using Fourier matrix, Walsh-Hadamard matrix, Haar matrix, Slant matrix, certain types of Toeplitz matrix, and certain types of circulant matrices that can be operated on a vector in a fast complexity class. These types of matrices, however, only form a limited class of transformations and therefore the resulting level of security may not be satisfactory.

To address the complexity issues while maintaining the security of the communication, systems and methods described herein employ an approach to build an arbitrary unitary matrix up from smaller matrices. In this approach, unitary matrices are built up in layers. Each layer includes two operations. The first operation is a permutation and the second operation is a direct sum of U(2) matrices. Permutation matrices are unitary matrices that do not require any floating point operations and therefore are computationally free, i.e., with O(1) complexity. U(2) matrices are matrices where most of the values are 0, except the 2×2 blocks along the diagonal (also referred to as block-U(2) matrices). These block-U(2) matrices involve only 4×N/2=2×N multiplications. As a result, a layer including a block-U(2) involves 2×N multiplications for the block-U(2) and no multiplications for the permutation. In other words, one layer during construction of a unitary matrix has complexity O(N).

The total complexity of constructing a unitary matrix is the product of the number of layers and O(N) that is the complexity of each layer. In some embodiments, the total number of layers can be log(N), and the total complexity of all of the layers is therefore O(N×log(N)), which is equivalent to the complexity of a standard OFDM. In addition, log(N) layers of block-U(2) and permutation matrices can produce a dense unitary. While the space of fast unitary matrices is not as large as the full space of unitary matrices, it can still be sufficiently large to make an attack by an eavesdropper prohibitive (see more details below with reference to FIG. 9).

In some embodiments, the approach described herein can employ block-U(m) matrices to build unitary matrices, where m is a positive integer (e.g., m=3, 4, 5, etc.). In some embodiments, matrices having different sizes can also be used within a single layer when constructing a unitary matrix. In some embodiments, different layers can use matrices having different sizes, e.g., a first layer uses block-U(m) matrices and a second layer uses block-U(l) matrices, where m is different from l. For example, if N=8, a set of four 2×2 block-U(2) matrices can be used in the first layer, followed by a permutation. Then two U(3) matrices and a single U(2) matrix can be used in the second layer, followed by another permutation. The third layer can include a block-U(2) matrix, a block-U(4) matrix, and then another block-U(2) matrix, followed by a third permutation.

In some embodiments, certain types of fast unitary matrices can also be written in terms of layers, each of which includes a permutation and a direct sum of blocks of smaller matrices. These types of matrices include, for example, Fourier matrices, Walsh-Hadamard matrices, Haar matrices, Slant matrices, and Toeplitz matrices. In some embodiments, the unitary matrix that can be constructed using the layered approach includes any matrix that is not a direct sum of discrete Fourier matrices.

Security Issues with Linear Transformations in Modulation

To illustrate the security vulnerabilities associated with data modulation using linear transformations, suppose that Alice and Bob are only applying a linear unitary matrix A to a data symbol $\bar{b}$ to get $\bar{s}=A\bar{b}$ at the transmitter, and then applying $A^\dagger$ (i.e., the inverse of matrix A) to $\bar{s}$ at the receiver to get $A^\dagger \bar{s} = A^\dagger A\bar{b} = \bar{b}$. In this case, suppose that Eve is able to collect a set of N linearly independent values of $\bar{s}$, denoted $\bar{s}_1, \bar{s}_2, \ldots, \bar{s}_N$. If Eve knows the corresponding untransformed bauds $\bar{b}_1, \ldots, \bar{b}_N$, she can arrange the untransformed bauds into a matrix $B=(\bar{b}_1, \ldots, \bar{b}_N)$, and the transformed bauds into the corresponding matrix $S=(\bar{s}_1, \ldots, \bar{s}_N)$. The equation linking B and S is then $$S = AB \quad (18)$$

As such, and because the bauds are assumed to be linearly independent and A is assumed to be unitary, S will be full rank (i.e., all rows and columns are linearly independent), and Eve can readily invert it, getting $$A = BS^{-t} \quad (19)$$

This gives Eve the entire matrix A, and as such, the security of the data transmission has been breached.

Non-Linear Transformations in Modulation

The foregoing example illustrates the security vulnerability that can exist when a linear transformation used for data modulation. The following sections describe embodiments for non-linearizing transformations during data modulation to improve security of data transmissions while avoiding drawbacks that are typically associated with non-linear operations. For example, as discussed above, non-linear transformations can amplify and/or distort a signal, thereby amplifying the noise, decreasing signal-to-noise ratio (SNR), and/or increasing the Bit Error Rate (BER). Some embodiments set forth herein accomplish a disruption of the linearity (i.e., a non-linearization) without amplifying (or minimally amplifying) the noise, in a way that may allow the system designer to tune the degree of non-linearity. Non-linear transformations described herein may not increase the total power of the signal, and are invertible, and thus permit data recovery at a receiver. The non-linear transformations can be applied to input data (e.g., data vectors or symbols derived therefrom) once or several times, optionally interleaved with other transformations (linear or otherwise) any number of times, prior to transmission of the transformed. For example, there may be 5 layers of a "block U(2)" matrix with a non-linear transformation (as set forth herein) and a permutation.

Figure 2:
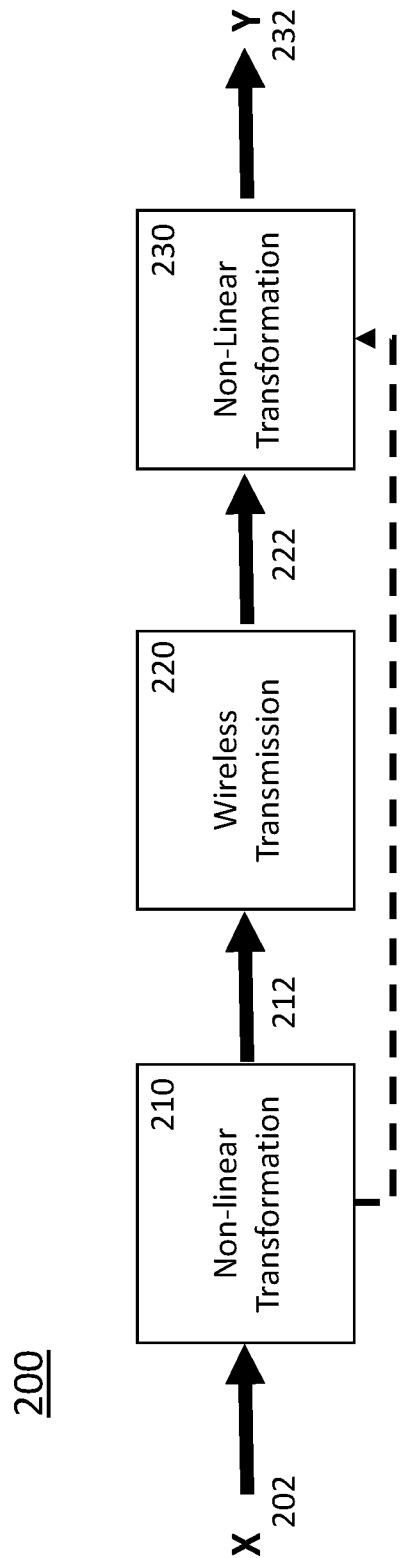
FIG. 2 is a block diagram illustrating a process flow for encoding and decoding a signal, according to an embodiment.

FIG. 2 is a block diagram illustrating a process flow for encoding and decoding a signal using a non-linear transformation, according to an embodiment. During the encoding and decoding process 200, an input data vector "X" is input at 202 to a compute device. A non-linear transformation (which is, optionally, a norm-preserving transformation) is applied via the compute device at 210 to the input data vector X to produce a transformed vector. The transformed vector is sent, at 212, to one or more transmitters for wireless transmission 220. One or more signals representing the transformed vector is sent to one more receivers at 222, and once received at the one or more receivers, the transformed vector is decoded/demodulated at 230 based on the non-linear transformation to reconstruct the input data vector at 232 (output "Y"). As indicated by the dashed line in FIG. 2, a representation of the non-linear transformation may have been transmitted from the compute device to the one or more receivers (e.g., prior to, concurrently with, in parallel with, overlapping in time with, or after transmission of the one or more signals representing the transformed vector is sent to one more receivers at 222).

In some embodiments, the non-linear transformation includes applying a first non-linear transformation and a second non-linear transformation prior to sending the signal representing the transformed data vector to the plurality of transmitters. The first and second non-linear transformations can be applied to a common set or subset of complex number pairs, or each can be applied to a different set or subset of complex number pairs. For an example of the latter case, suppose an input data vector has a length of 4, and includes components (i.e., complex numbers) 1, 2, 3, and 4. Now suppose that prior to the first non-linear transformation, components 1 and 2 are paired as one pair, and components 3 and 4 are paired as another pair. The first non-linear transformation is then applied to the (1,2) pair and to the (3,4) pair, for example in parallel or overlapping in time. Next, another set of pairs is identified, in which components 1 and 3 are paired as one pair, and components 2 and 4 are paired for the second pair. The second non-linear transformation is then applied to the (1,3) pair and to the (2,4) pair, for example in parallel or overlapping in time. Note that, in some embodiments, although the first non-linear transformation can be applied to the (1,2) pair and to the (3,4) pair in parallel and the second non-linear transformation can be applied to the (1,3) pair and to the (2,4) pair in parallel, the first and second non-linear transformations are not performed in parallel, since the input to the second non-linear transformation is the output from the first nonlinear transformation.

Example Nonlinear Operations

In some embodiments, a nonlinear operation Q is applied q times in the first part of a fast transform. Each $Q_i$ has a length N vector associated with it, denoted $\overline{w}_i$, and there is a total of q such vectors. The values in $\overline{w}_i$ can be referred to as "activators" for the full nonlinear transform Q. Each component of $\overline{w}_i$ is a 2-bit value. As such, in all, there are 2N bits in each $\overline{w}_i$.

The action of $Q_i$ (which depends on $\overline{w}_i$) is pairwise, on adjacent values of $\overline{b}$ (i.e., components 1 and 2, then components 3 and 4, etc.). The action can be illustrated with reference to a single 2 component block. Q can include a modification of the second component of each doublet of the vector if and only if some condition on the values of $\overline{w}$ and $b_1$ are met, in a way that depends on what those values are. The following is example pseudo-code for the action of Q on a single doublet. The input is the two vector components $b_1$ and $b_2$ (which reside in the constellation C) and the two 2-bit values $w_1$ (with bits $w_{11}$ and $w_{12}$) and $w_2$ (with bits $w_{21}$ and $w_{22}$).

```
if w11 == 0 then
    if (--1)^w12 == Sign (Re(b1)) then
        if (w21, w22) == (0, 0) || (w21, w22) == (1, 1) then
            b2 ← --b2
        end if
        if (w21, w22) == (0, 1) then
            b2 ← b2*
        end if
        if (w21, w22) == (1, 0) then
            b2 ← -b2*
        end if
    end if
end if
if w11 == 1 then
    if (--1)^w12 == Sign (Im(b1)) then
        if ((w21, w22) == (0, 0) || (w21, w22) == (1, 1)) then
            b2 ← --b2
        end if
        if (w21, w22) == (0, 1) then
            b2 ← b2*
        end if
        if (w21, w22) == (1, 0) then
            b2 ← -b2*
        end if
    end if
end if
```

The function Sign(x) is a function that returns +1 when x>0 and −1 when x<0. As an example, consider a case in which $w_1$ and $w_2$ are (1; 0) and (1; 1), respectively, and $b_1=1+i$ and $b_2=1+i$. Since $w_{11}=1$, the imaginary part of $b_1$ is considered. The sign of the imaginary part of $b_1$ is Sign $(Im(b_1))$=Sign $(Im(1+i))$=Sign$(+1)$=+1. The value $(-1)^{w12}= (-1)^0$=+1. As such, it is the case that $(-1)^{w12}$==Sign (Im $(b_1)$). Because $w_2(1, 1)$, $b_2 \leftarrow -b_2$ and the action of Q on this doublet is:

$$\begin{pmatrix} 1+i \\ -1+i \end{pmatrix} \rightarrow \begin{pmatrix} 1+i \\ 1-i \end{pmatrix} \tag{0.1.1}$$

Note that the first (top) component is unchanged. The foregoing is performed for each doublet of the vector, and such operations collectively constitute a single application of Q. The permutations are included so that different components act as "control gates" for other components at each of the q layers. Note that the action of Q is unitary, though highly nonlinear.

In some embodiments, generating the transformed data vector also includes performing a linear transformation or a discrete Fourier transform after applying the non-linear transformation. Alternatively or in addition, the one or more receivers that receive the one or more signals representing the transformed vector includes a plurality of antenna arrays, and the receiver(s) and the transmitter(s) can be configured to perform Multiple Input Multiple Output (MIMO) operations.

Figure 3:
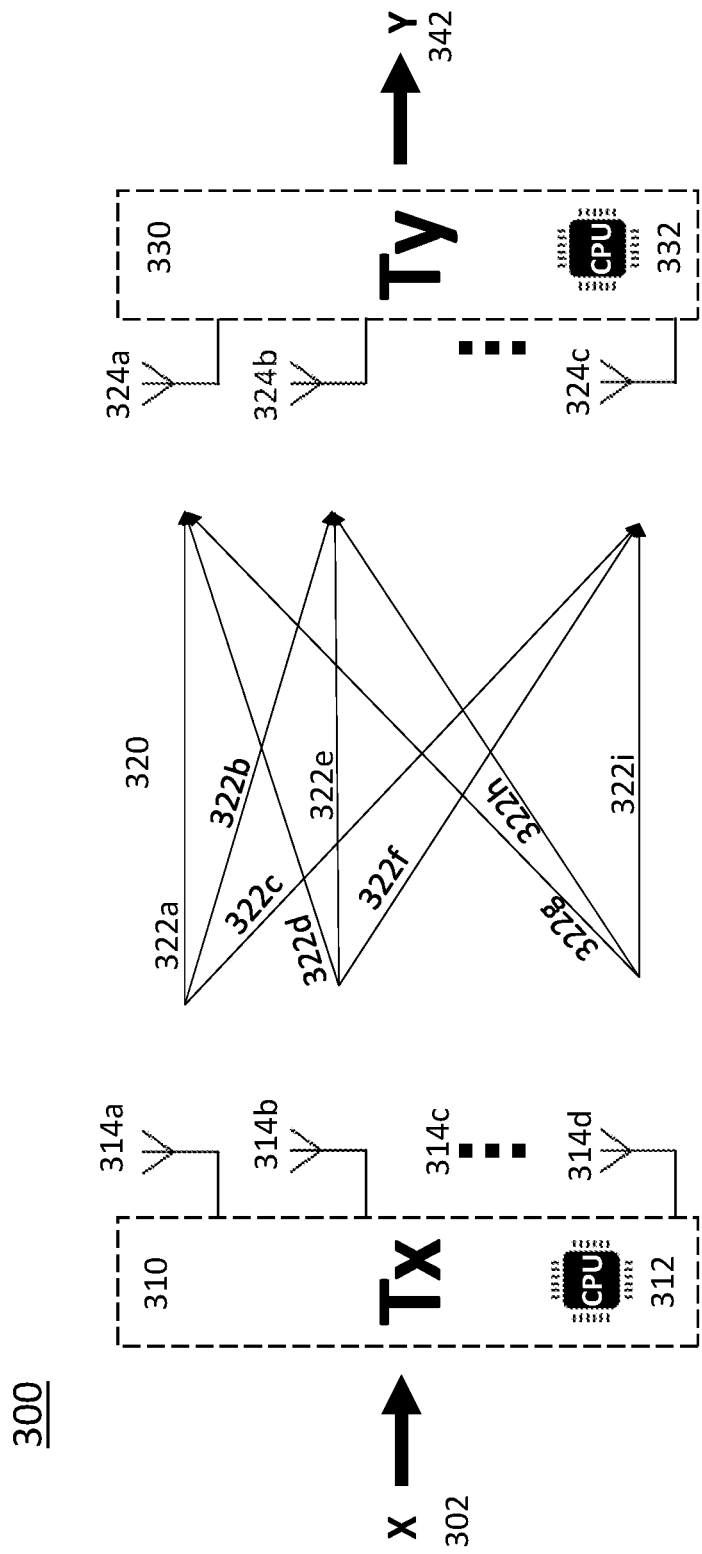
FIG. 3 is a diagram illustrating a system for encoding and decoding a signal, according to an embodiment.

FIG. 3 is a diagram illustrating a system for encoding and decoding a signal (e.g., for implementing the process 200 of FIG. 2), according to an embodiment. The system 300 includes one or more transmitters ("Tx") 310 each including a processor 312 and multiple antennas 314a through 314d. The transmitter 310 is communicatively coupled, via a wireless communications network 320, to one or more receivers ("T$_r$") 330 each including a processor 332 and multiple antennas 324a through 324c. An input data vector X is received at the system at 302 and is transformed, via a non-linear transformation, into a transformed data vector that is transmitted by the transmitter 310, via one or more of the antennas 314a through 314d the network 320, to the receiver(s) 330. The transformed vector is received at the receiver(s) 330, via one or more of the antennas 324a through 324c, and demodulated based on the non-linear transformation to produce the recovered data vector Y at 342. Each of the antennas 314a through 314d can transmit signals to multiple antennas from the antennas 324a through 324c. In other words, the antennas 314a through 314d of the receiver 310 and the antennas 324a through 324d of the receiver 330 can be configured to perform Multiple Input Multiple Output (MIMO) operations as follows: antenna 314a of transmitter 310 can send signals via the wireless communications network 320 to one of, a subset of, or all of antennas 324a, 324b, and 324c of the receiver 330 (as signals 322a, 322b and 322c, respectively). Similarly, antenna 314b of transmitter 310 can send signals via the wireless communications network 320 to one of, a subset of, or all of antennas 324a, 324b, and 324c of the receiver 330 as signals 322d, 322e and 322f, respectively), and antenna 314c of transmitter 310 can send signals via the wireless communications network 320 to one of, a subset of, or all of antennas 324a, 324b, and 324c of the receiver 330 as signals 322g, 322h and 322i, respectively).

Figure 4:
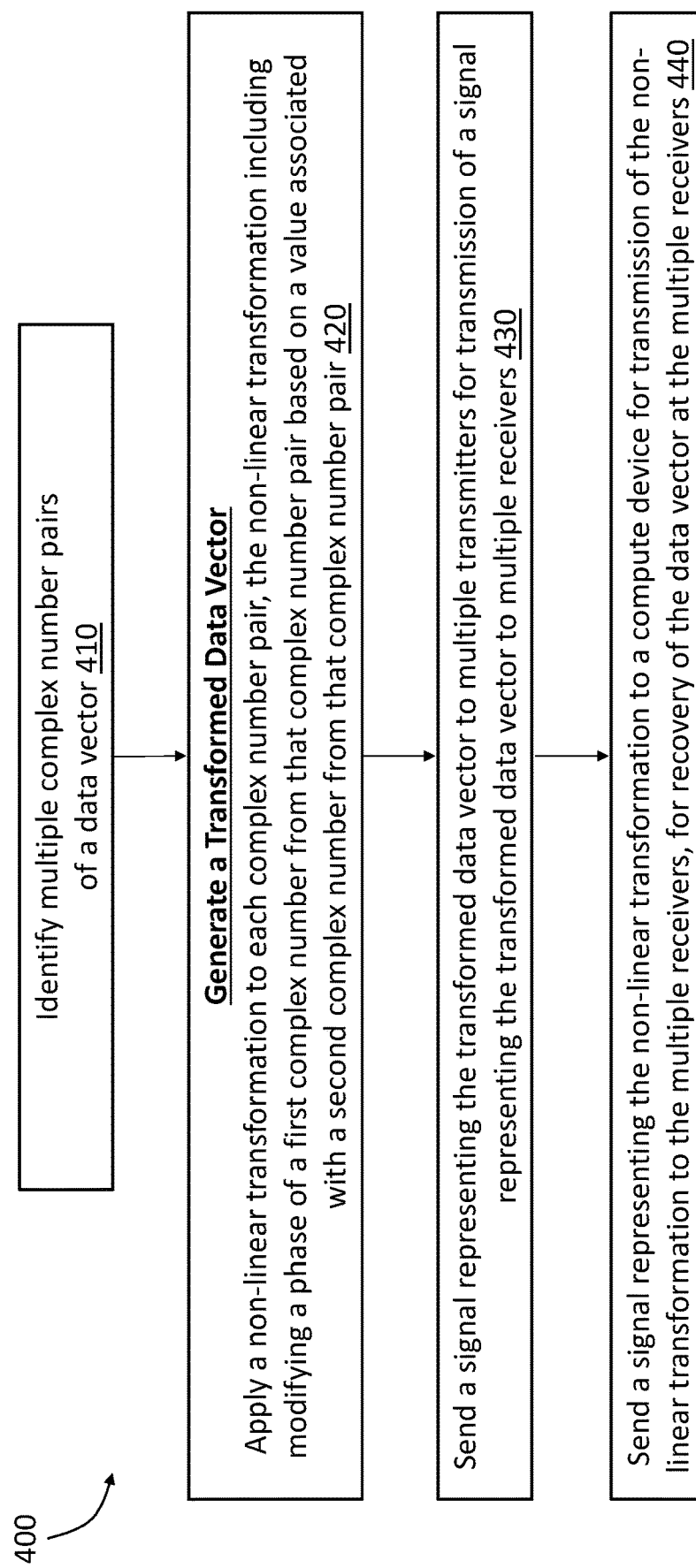
FIG. 4 is a flowchart illustrating an example method for modulating data using a non-linear transformation, according to an embodiment.

FIG. 4 is a flowchart illustrating an example method for modulating data using a non-linear transformation, according to an embodiment. As shown in FIG. 4, the method 400 includes identifying, at 410 and via a processor of a first compute device, multiple complex number pairs of an input data vector. The input data vector includes multiple complex numbers. At 420, a transformed data vector is generated by applying, to each pair of complex number pairs from the multiple complex number pairs, a non-linear transformation. The non-linear transformation includes modifying a phase of a first complex number from that complex number pair based on a value associated with a second complex number from that complex number pair. A signal representing the transformed data vector is sent, at 830, to multiple transmitters for transmission of a signal representing the transformed data vector from the multiple transmitters to multiple receivers. At 440, a signal representing the non-linear transformation is sent to a second compute device for transmission of the non-linear transformation to the multiple receivers prior to, concurrently with, overlapping in time with, or after transmission of the signal representing the transformed data vector to the multiple receivers, for recovery of the data vector at the plurality of receivers.

In some embodiments, modifying the phase of the first complex number from the complex number pair is also based on a predetermined factor, and the method 400 also includes sending a signal representing the predetermined factor to the plurality of receivers prior to, concurrently with, overlapping in time with, or after transmission of the signal representing the transformed data vector from the plurality of transmitters to the plurality of receivers, for recovery of the data vector at the plurality of receivers.

In some embodiments, an input data vector includes multiple complex numbers that are broken up into their "norm" (or "magnitude") and phase components. For example, each complex number z can be written as:

$$z = re^{i*x},$$

where r is a positive real number and x is a real number within [0, 2 pi).

The multiple complex numbers are broken up into complex number pairs (e.g., multiple complex number pairs are detected or selected), and differences between the two norms of each pair are calculated. If r1 is the norm of one of the two complex numbers and r2 is the norm of the other, the difference is calculated as r1−r2 or r2−r1. The difference is then raised to a power p, to obtain an intermediate value (r1−r2)*p or (r2−r1)*p. The intermediate value is then multiplied by a predetermined constant, R, to obtain the value: R*(r1−r2)*p or R*(r2−r1)*p. This value is then used to define an angle by which the phase of the original complex number (z1 or z2) having the smaller norm is rotated/adjusted.

As an example, given a pair complex numbers from a complex number pair as follows:

$$z1 = r1 * e^{\{i\,x1\}}$$

$$z2 = r2 * e^{\{i\,x2\}}$$

Assuming that r2<r1, the phase of z2 is adjusted while z1 remains unchanged, as follows:

$$z1 = r1 * e^{\{i\,x1\}}$$

$$z2 = r2 * e^{\{i\,x2\}} * e^{\{i\,R*(r1-r2)[<]BEGINITALmp\}}$$

In other words, the complex number having the smaller magnitude is rotated in the complex plane by an angle proportional to a power of the difference between the magnitudes of the complex numbers of the pair (i.e., a non-linear transformation). Simulation has shown that for any N (N being the number of subcarriers) and any underlying constellation, there is a value of p and R that render any attempt by an eavesdropper at a linear attack impossible, while having a negligible impact on the BER (at most, less than half a dB of cluster variance for realistic SNRs). A "constellation" (or constellation diagram) is a representation of a signal modulated by a digital modulation scheme.

In some embodiments, the values of R and p vary for each pair of symbols in each baud. For example, R may be a function of which "layer" (e.g., in the sense described above, where "layers" are made up of block-U(2)s and permutations, discussed above) and/or a function of which pair of symbols is being operated on.

In some embodiments, a non-linear transformation can be performed at any stage of precoding or pre-transmission operations and/or on any set of pairs of complex numbers in the input data vector. For example, the non-linear transformation can be performed one or more of: once at the beginning of precoding or pre-transmission operations, once at the end of precoding or pre-transmission operations, between each block-U(2) and permutation (i.e., after the block-U(2) and before the permutation), etc. The non-linear transformation can be interleaved with any number and combination of other precoding operations, whether linear or non-linear. In some embodiments the non-linear transformation is applied to all complex number pairs of an input vector. In other words, each complex number is paired with one other complex number, making a total of N/2 pairs. In other embodiments, the non-linear transformation is only applied to a subset of the complex number pairs of an input vector and not to other complex number pairs of the input vector.

In some embodiments, the non-linear transformation is performed as follows. Take two components of the total (length-N) baud. Both components may be complex numbers, so they can be written as:

$$\begin{pmatrix} z_1 \\ z_2 \end{pmatrix} = \begin{pmatrix} r_1 e^{i\theta_1} \\ r_2 e^{i\theta_2} \end{pmatrix} \quad (20)$$

A single 2-vector is presented above for the sake of discussion, however other vector lengths/sizes can also be used (e.g., single 3-vector, single 4-vector, multiple vectors, etc.). The following operation can be performed on any two components of the vector, and the two components need not necessarily be adjacent to each other. In some implementations, several layers of "fast-UBDM" layers of block-U(2)s and permutations are applied first, followed by applying the non-linear transformation to each pair of vectors (e.g., adjacent or "side-by-side" pairs at this point, since the vector pairs been permuted and mixed several times by the layers), followed by one or more additional "fast" layers.

To perform the non-linear transformation on a single pair of components, two parameters may be selected: a power p (which can be any real number, e.g., 1, 2, or 3) and a value R, which is a real number. Given the two complex numbers, a rotation is applied to the complex number with the smaller magnitude by an angle proportional to the difference between the two absolute values. The smallest rotation will occur when $(r_1-r_2)=0$, which results in a rotation of 0. The greatest rotation will occur when $(r_1-r_2)$ is the maximum possible distance, which will depend on the constellation being used.

For every pair of complex numbers as in (20), the difference $(r_1-r_2)$ is calculated, raised to the power p, then multiplied by R to produce a value that will define the degree of phase rotation applied to the complex number having the smaller magnitude. In other words, the following phase shift is calculated:

$$\phi = R(r_1-r_2)^p$$

When $r_1=r_2$, this expression is 0. As $(r_1-r_2)$ increases, $\phi$ also increases, and the power p controls the rate at which $\phi$ grows. Once $\phi$ has been computed, the complex number with the smaller magnitude is multiplied by $e^{i\phi}$. For example, suppose that in (20) that $r^1>r^2$. The transformation would be:

$$\begin{pmatrix} r_1 e^{i\theta_1} \\ r_2 e^{i\theta_2} \end{pmatrix} \rightarrow \begin{pmatrix} r_1 e^{i\theta_1} \\ r_2 e^{i(\theta_2+\phi)} \end{pmatrix}$$

The receiver goes through a similar process, except that once the receiver computes $\phi$, it rotates the complex value with the smaller magnitude in the opposite direction.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, and solid state storage devices; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

The invention claimed is:

1. A method, comprising:
identifying, via a processor of a first compute device, a plurality of complex number sets of a data vector;
generating a transformed data vector by applying, to each complex number set from the plurality of complex number sets, a non-linear transformation that includes modifying a phase of a first complex number from that complex number set based on a value associated with a second complex number from that complex number set, each complex number set from the plurality of complex number sets having at least two complex numbers;
sending a signal representing the transformed data vector to a plurality of transmitters for transmission of a signal representing the transformed data vector from the plurality of transmitters to a plurality of receivers; and
sending a signal representing the non-linear transformation to a second compute device for transmission of the non-linear transformation to the plurality of receivers, for recovery of the data vector at the plurality of receivers.

2. The method of claim 1, wherein the non-linear transformation is a first non-linear transformation, and generating the transformed data vector further includes applying a second non-linear transformation prior to sending the signal representing the transformed data vector to the plurality of transmitters.

3. The method of claim 1, wherein the plurality of complex number sets is a first plurality of complex number sets, the method further comprising:
identifying, via the processor, a second plurality of complex number sets of the data vector, the second plurality of complex number sets different from the first plurality of complex number sets,
the generating the transformed data vector further including applying a second non-linear transformation to each complex number set from the second plurality of complex number sets.

4. The method of claim 3, wherein applying the non-linear transformation to each complex number set from the second plurality of complex number sets includes applying the non-linear transformation to a first subset of complex number sets from the second plurality of complex number sets and applying the non-linear transformation to a second subset of complex number sets from the second plurality of complex number sets, the applying the non-linear transformation to the first subset and the applying the non-linear transformation to the second set performed substantially in parallel.

5. The method of claim 1, wherein applying the non-linear transformation to each complex number set from the plurality of complex number sets includes applying the non-linear transformation to a first subset of complex number sets from the plurality of complex number sets and applying the non-linear transformation to a second subset of complex number sets from the plurality of complex number sets, the applying the non-linear transformation to the first subset and the applying the non-linear transformation to the second set performed substantially in parallel.

6. The method of claim 1, wherein generating the transformed data vector further includes performing a linear transformation after applying the non-linear transformation.

7. The method of claim 1, wherein generating the transformed data vector further includes performing a discrete Fourier transform after applying the non-linear transformation.

8. The method of claim 1, wherein the plurality of receivers includes a plurality of antenna arrays, the plurality of receivers and the plurality of transmitters configured to perform Multiple Input Multiple Output (MIMO) operations.

9. The method of claim 1, wherein the non-linear transformation is a norm-preserving transformation.

10. The method of claim 1, wherein modifying the phase of the first complex number from the complex number set is further based on a predetermined factor, the method further comprising sending a signal representing the predetermined factor to the plurality of receivers, for recovery of the data vector at the plurality of receivers.

11. A system, comprising:
a plurality of receivers;
a plurality of transmitters; and
at least one processor operably coupled to the plurality of transmitters, the at least one processor configured to:
identify a plurality of complex number sets of a data vector, each complex number set from the plurality of complex number sets having at least two complex numbers; and
generate a transformed data vector by applying, to each complex number set from the plurality of complex number sets, a non-linear transformation that includes modifying a phase of a first complex number from that complex number set based on a value associated with a second complex number from that complex number set; and
send a signal representing the transformed data vector to a plurality of transmitters for transmission of a signal representing the transformed data vector from the plurality of transmitters to a plurality of receivers.

12. The system of claim 11, wherein the non-linear transformation is a first non-linear transformation, the at least one processor further configured to generate the transformed data vector by applying a second non-linear transformation prior to sending the signal representing the transformed data vector to the plurality of transmitters.

13. The system of claim 11, wherein the plurality of complex number sets is a first plurality of complex number sets, the at least one processor further configured to:
identify a second plurality of complex number sets of the data vector, the second plurality of complex number sets different from the first plurality of complex number sets, and
generate the transformed data vector by applying a second non-linear transformation to each complex number set from the second plurality of complex number sets.

14. The system of claim 13, wherein applying the non-linear transformation to each complex number set from the first plurality of complex number sets and applying the non-linear transformation to each complex number set from the second plurality of complex number sets are performed substantially in parallel.

15. The system of claim 11, wherein the non-linear transformation is a first non-linear transformation, the at least one processor further configured to generate the transformed data vector by applying a second non-linear transformation to each complex number set from the plurality of complex number sets, the first non-linear transformation and the second non-linear transformation being performed substantially in parallel.

16. The system of claim 11, wherein generating the transformed data vector further includes performing a linear transformation after applying the non-linear transformation.

17. The system of claim 11, wherein generating the transformed data vector further includes performing a discrete Fourier transform after applying the non-linear transformation.

18. The system of claim 11, wherein the plurality of receivers includes a plurality of antenna arrays, the plurality of receivers and the plurality of transmitters configured to perform Multiple Input Multiple Output (MIMO) operations.

19. The system of claim 11, wherein the non-linear transformation is a norm-preserving transformation.

* * * * *

UNITED STATES PATENT AND TRADEMARK OFFICE
CERTIFICATE OF CORRECTION

Page 1 of 1

PATENT NO.         : 11,025,470 B2
APPLICATION NO.    : 16/459254
DATED              : June 1, 2021
INVENTOR(S)        : Matthew Brandon Robinson It is certified that error appears in the above-identified patent and that said Letters Patent is hereby corrected as shown below:

In the Specification

Column 10, Line 19:
"$z2=r2*e^{\{i\,x2\}}*e^{\{i\,R*(r1-r2)[<]BEGINITAL mp\}}$,, Should instead read:
-- $z2 = r2 * e^{\{i\,x2\}} * e^{\{i\,R*(r1\,-r2)\wedge p\}}$ --

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*